3,496,001
METHOD OF PRODUCING SUEDE-LIKE
SYNTHETIC LEATHERS
Ichiro Minobe and Takashi Suzuki, Ibaraki-shi, Japan, assignors to The Toyo Rubber Industries Co., Ltd., Osaka, Japan
Filed Jan. 10, 1967, Ser. No. 608,431
Claims priority, application Japan, Jan. 10, 1966, 41/1,191
Int. Cl. D06n 3/14
U.S. Cl. 117—11                 10 Claims

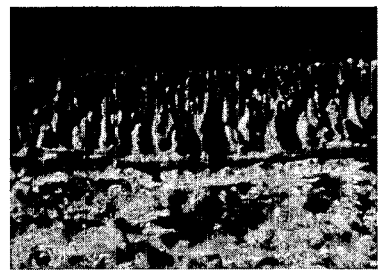
FIG. I
FIG. 2
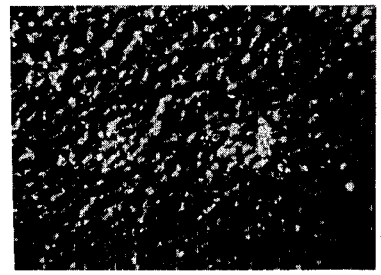
FIG. 3

ABSTRACT OF THE DISCLOSURE

Production of artificial suede-like leather by coating a pore forming polymer composition on a substrate, coagulating said coating to form a surface film thereon, extracting solvents and non-solvents from the coating and removing the coagulated surface film from the coated layer to expose a suede-like layer.

Polymer composition contains (a) solution of 15 to 30% by weight of polymer, e.g. polyester-urethane elastomer, in solvent, (b) solid inorganic particles of from 40 m$\mu$ to 2$\mu$, and (c) coagulant or non-solvent for the polymer in an amount of up to 15% of the coagulating value for the polymer solution. Fibrous substrate coated to thickness of 0.5 to 3.0 mm. Coagulation by immersion of coating in bath containing 85% or more of non-solvent for polymer.

BACKGROUND OF THE INVENTION

Field of the invention

This invention relates to the manufacture of suede-like artificial leathers. More particularly, it is concerned with a method of reproducibly preparing artificial leathers having a coating layer of a honeycomb-like structure and exhibiting the external appearance and touch of "suede" and having high moisture and air permeability and abrasion resistance. The field of invention also includes artificial, suede-like leather products.

Suede-like artificial leathers, hitherto, have been prepared by, e.g., an electrostatic flock printing or napping treatment of fibrous sheet material, and those prepared in the prior methods have some disadvantages as, for example, poor moisture permeability, poor air permeability, tendency to lose surface lustre when being rubbed or poor wearing resistance.

Description of prior art

Recently, there was proposed a method of preparing suede-like artificial leathers by forming a honeycomb-like porous layer of polymeric material on a fibrous substrate and shearing or rubbing off the surface skin of the porous coating layer. This method, however, has a significant defect in that it lacks sufficient reproducibility in the formation of the honeycomb-like structure in the polymeric coating layer. We think, from experience, the formation of honeycomb-like structure in the porous polymeric layer in this method is rather an accident caused by the instability of the polymeric layer during its formation. It is necessary to introduce many improvements into this method to attain constant formation of the polymeric layer having a uniform honeycomb-like structure.

It is an object of the present invention to provide a method of preparing artificial leathers of the external appearance and touch of "suede" in which a polymeric coating layer of uniform, honeycomb-like structure, which gives the external appearance and touch of suede to the final product, is formed with sufficient reproducibility. Artificial leathers having the external appearance and touch of suede in this invention are obtained by removing the surface skin of the coating layer of the uniform honeycomb-like structure, e.g. by grinding.

SUMMARY OF THE INVENTION

The object of the present invention may be attained by the method which comprises the steps of applying to a substrate a coating composition having a solid synthetic polymer content of 15 to 30% by weight and a viscosity of 5,000 to 50,000 cps. The composition is prepared by incorporating into a solution of a polyester-urethane elastomer a finely divided inorganic material which has an average particle size of from 40 millimicrons to 2 microns and is substantially insoluble in both the solvent and coagulant for the synthetic polymer, and a coagulant or non-solvent for the synthetic polymer in an amount of up to 15% of the coagulating value for the synthetic polymer solution. The composition is applied to a fibrous substrate to form a liquid coating layer of from 0.5 to 3.0 mm. thickness, soaking the so formed coating layer in a coagulating bath containing at least 85% by weight of a non-solvent for the synthetic polymer to coagulate said coating layer, without exposing said coating layer to vapor of the non-solvent for said synthetic polymer and to damp air before soaking in said coagulating bath, completely eliminating the solvent and non-solvent from said coating layer, thus coagulated, by extraction and drying, and removing the surface skin of the coating layer thus formed by grinding. In brief, the method of the present invention consists of five steps: (a) preparation of a coating composition, (b) application of said coating composition to a fibrous substrate, (c) coagulating treatment, (d) elimination of solvent and non-solvent or coagulant from the coating layer and (e) removal of the surface skin from the coating layer for example, by grinding. In these matters, (a) and (c) are most essential to formation of the coating layer having a uniform honeycomb-like structure resulting in a suede-like external appearance. The advantages brought about by the present invention are attributable to the fact that extraction of the solvent from the coating layer of the synthetic polymer solution on the fibrous substrate during coagulation is properly controlled. Upon coagulation a semi-permeable membrane, which will control diffusion or penetration of the solvent and/or the coagulant, is promptly formed on the surface of the coating layer of the synthetic polymer solution.

BRIEF DESCRIPTION OF DRAWING

FIGURE 1 is a microscopic photograph ($\times$50) of a cross-section of a honeycomb-structured polymeric coating layer on a fibrous substrate prepared in the manner as in Example 2.

FIGURE 2 is a microscopic photograph ($\times$50) of the cross-section of the honeycomb-structured coating layer as shown in FIGURE 1 after removal therefrom of the surface skin by grinding or shaving, and FIGURE 3 is a microscopic photograph ($\times$50) of the surface of the suede-like artificial leather as shown in FIGURE 2.

DESCRIPTION OF PREFERRED EMBODIMENTS

It is preferred for the present invention to use as the synthetic polymer a polyurethane elastomer derived from a hydroxy-terminated polyester. We have discovered by many experiments that the polyester-urethane elastomer has a far greater tendency, than polyalkylene - etherurethane elastomer, to form a honeycomb-like structure composed of numerous oval voids having the largest dimension perpendicular to the surface of the fibrous substrate. In general, although a solution of polyester-urethane elastomer requires for precipitation of the polymer the addition of a large amount of a non-solvent or coagulant to the solution compared with a solution of polyalkylene-ether-urethane elastomer, a thin coating layer of the solution of a thickness of 3 mm. or less has a greater tendency, than that of the polyalkylene-ether-urethane elastomer, to promptly form a relatively thick, microporous surface layer of high density on the surface of the coating layer when the coating layer is exposed to an atmosphere containing vapor of a non-solvent for the synthetic polymer or soaked in a bath containing a non-solvent for the synthetic polymer. By this skin layer, penetrative diffusion of solvent and non-solvent through the interface between the coating layer and the coagulating bath liquid is hindered to a great extent, so that extraction of the solvent within the coating layer is retarded. Thus, microscopic voids within the coating layer grow up, with extraction of the solvent, to oval voids of visible size having the largest dimension perpendicular to the surface of the coating layer. This is a desirable characteristic for formation of the honeycomb-structured coating layer of the present invention, so that the polyester-urethane elastomer is regarded as the most suitable synthetic polymer for the object of the present invention.

In the synthesis of polyester-urethane elastomers to be used in the practice of the present invention, there preferably are used hydroxy-terminated polyesters prepared by polycondensation of an aliphatic dicarboxylic acid and molar excess of an aliphatic glycol, and those prepared by ring-opening polymerization of a cyclic ester in the presence of a difunctional compound, as an initiator. The polyesters obtainable by polycondensation of an aliphatic dicarboxylic acid and an aliphatic glycol are exemplified by those obtained by reaction between adipic acid, sebacic acid, maleic acid or like dicarboxylic acid and ethylene-glycol, 1,2-propyleneglycol, 1,4-butyleneglycol, 1,3-butylene-glycol or like aliphatic diol. Examples of the polyesters prepared by polymerization of epsilon - caprolactone, delta-methyl-epsilon-caprolactone, $\beta$-propiolactone or like cyclic ester in the presence of an initiator, such as, e.g., 1,4-butyleneglycol, ethylene-glycol or diethyleneglycol. Among the polyesters preferably used are polyester glycols containing substantially two terminal hydroxy groups and having a molecular weight of from 400 to 4,000.

The polyester-urethane elastomer may be prepared by reacting a polyester glycol and an organic diisocyanate to form an isocyanate-terminated prepolymer and reacting the prepolymer in bulk or in solution with a chain extender. Alternately, the polyester glycol, organic diisocyanate and chain extender may be reacted in one shot.

As the organic diisocyanate there preferably are used aromatic ones, such as, diphenylmethane - p,p' - diisocyanate, di-o-tolyl-p,p'-diisocyanate, 2,4- and 2,6-tolylene diisocyanates and 1,5-naphthylene diisocyanate.

As the chain extender there may be used substantially difunctional active hydrogen-containing compounds such as, e.g., ethyleneglycol, 1,2-propyleneglycol, 1,4-butyleneglycol, neo-pentylglycol, diethyleneglycol, dipropyleneglycol, 2,2-bis-(oxyethylphenyl)propane and like glycols; water, and hydrazine, ethylenediamine, 1,2-propylenediamine, piperazine and like diamines. In the case of using water or organic diamines as chain extender, it is difficult to properly control the reaction, so that it is preferred to carry out the preparation of polyurethane elastomer in a prepolymer process and conduct the chain extending reaction in solution.

In the present invention, it is necessary that the synthetic polymer solution has a relatively high viscosity and, therefore, the synthetic polymer prepared by chain extension has a relatively high molecular weight. Solutions of substantially linear polymers of intrinsic viscosities within the range from 0.8 to 1.4 as measured at 25° C. in N,N,-dimethyl-formamide are most preferred.

The solvents for the polyester-urethane elastomer should be those which are well miscible with the non-solvent to be used. Examples of solvents which preferably used are: N,N-dimethyl-formamide, N,N-dimethyl- acetamide, dimethylsulfoxide, tetra-methyleneurea, tetrahydrofuran, dichloromethane, dioxane and the like. Mixtures of a lower aliphatic ketone, such as acetone or methyl ethyl ketone, lower aliphatic ester, such as ethyl acetate, or cyclic ether, such as tetrahydrofuran or dioxane, with an inorganic salt soluble in such organic solvents may also be used as solvents for the polyester-urethane elastomer. As far as they are uniformly soluble in or miscible with the solution of polyester-urethane elastomer, there may be incorporated in the solution, curing agents, pigments, plasticizers, stabilizers, antioxidants, and other conventional compounding ingredients. Vinyl polymers, butadiene-acrylonitrile copolymers and like synthetic polymers capable of being uniformly dissolved in the solution may also be incorporated. However, incorporation of these ingredients is not essential in the present invention.

Another preferred condition of the present invention is to incorporate in the polyester-urethane elastomer solution a finely divided inorganic solid which is substantially insoluble in the solvent and non-solvent for the elastomer and has a particle size of between 40 millimicrons and 2 microns. This is one of the most important factors for the formation of the honeycomb-like structure in the coating layer of the polymer solution. It seems that said finely divided inorganic solids serve as nuclei which will induce coagulation of the synthetic polymer in the coagulating bath and results in formation of the honeycomb-like structure with sufficient reproducibility. Since a solution of amorphous soft polymer is not so sensitive to the action of coagulant or precipitant for the polymer as in the case of the polyester-urethane elastomer solution of the present invention, it is necessary to control and regulate precipitation or coagulation of the polymer by introducing nuclei which will induce precipitation or coagulation of the polymer. We have discovered that this is achieved by uniformly dispersing a finely divided inorganic solid in the polymer solution and this makes it possible to form a uniform porous layer of elastomer having a uniform honecycomb-like structure.

The inorganic solid should be such that it is substantially insoluble in the solvent and non-solvent for the synthetic polymer and is stable in the subsequent extracting and drying steps.

The finely divided inorganic solids used in the present invention must be of a particle size between 40 millimicrons and 2 microns. Although those having particle sizes outside the above range serve as nuclei for formation of precipitation, they do not lead to the best results. For instance, a finely divided inorganic solid having a particle size above 2 microns makes the polymer solution dilatant and muddy, and it may precipitate during storage of the solution. In addition, a solution of such nature is difficult to coat uniformly onto a substrate, as the viscosity of such solution varies to a great extent depending upon the shearing rate. On the other hand, those having a particle size of less than 40 millimicrons, e.g., of 15–25 millimicrons, give a coating composition which shrinks to a very great extent upon coagulation and results in a coating film with an irregular honeycomb-like structure.

Examples of finely divided inorganic solids preferably used in the present invention are: precipitated light calcium carbonate, magnesium carbonate, fine clay, hydrated silicates, zinc oxide and the like. The inorganic solid is added to and uniformly dispersed in a synthetic polymer solution substantially free of any non-solvent for the synthetic polymer to form a homogeneous coating composition.

A third preferred condition is that the coating composition is substantially free of any liquid which is non-solvent for the synthetic polymer and miscible with the solvent for the polymer in the composition. The coating composition may contain, such liquid, in an amount not exceeding 15% of the coagulating value of the non-solvent to the synthetic polymer solution. The term "coagulating value" means the percentage of the quantity of a non-solvent to the total quantity of the non-solvent and solvent in the system when the non-solvent is added to a synthetic polymer solution dropwise until substantial precipitation of the synthetic polymer takes place.

As disclosed in our copending Japanese patent application mentioned above, when a non-solvent for the polymer is added in an amount just a little insufficient to cause substantial precipitation of the polymer colloidal particles are formed in the synthetic polymer solution and the particles serve as nuclei which will induce uniform coagulation of polymer. However, it is a characteristic feature of the present invention to retard formation of such nuclei. Therefore, in the method of the present invention, the amount of the nonsolvent, if added to the synthetic polymer solution, should be confined to up to 15% of the coagulating value of the non-solvent to the polymer solution. In general, with addition of a precipitant to a synthetic polymer solution, the clear solution becomes greyish white, yellowish white and then milky white and, finally, phase separation occurs, causing precipitation of polymer. In the practice of the present invention it is necessary to keep the synthetic polymer solution in the state of a clear solution in which colloidal particles is firmed by addition of the precipitant, are of a particle size not exceeding 500 A. to retard formation of such nuclei.

Examples of liquids which may be used as the non-solvent are, for instance, water, methanol, ethanol, ethyleneglycol and glycerol. These liquids may also be used as coagulants for complete coagulation of the coating layer of the synthetic polymer solution on a fibrous substrate and for extraction of solvent from the coating layer.

As set forth above, it is preferable to use synthetic polymer solutions substantially free of non-solvent, especially those completely free of non-solvent. However, in cases where a coating composition of the type completely free of non-solvent is continuously and gradually introduced, in the form of a coating layer on a fibrous web, into a coagulating bath consisting essentially of water, a ripple mark is sometimes formed on the surface of the coagulated coating layer. In such a case, it is preferred to add to the coating composition an amount, within the limits as set forth above, of a relatively weak coagulant for the polyester-urethane elastomer, such as, e.g., methanol or ethanol, to lower the interfacial tension between the coating composition and coagulating bath.

It is a fourth preferred condition that the concentration and viscosity of the coating composition be regulated. The basic idea of the present invention consists, as repeatedly mentioned above, in sufficiently retarding and localizing extraction of the solvent from the layer of the coating composition. The higher the concentration and/or viscosity of the coating composition, the lower the rate of extraction of the solvent in the composition by the non-solvent in the coagulating bath. It is essential to use a polymer solution having a solid synthetic polymer content of 15 to 30, preferably 18 to 25% by weight and a viscosity within the range from 5,000 to 50,000, preferably from 10,000 to 30,000 cps.

The coating composition is applied to a porous fibrous substrate or base by means of, e.g., doctor knife, roll coater or calendering machine. Suitable fibrous substrates include woven and knit fabrics, non-woven fabrics, paper and the like, though most preferred are napped- and flock-printed woven fabrics and needle-punched non-woven fabrics. The fibrous substarte may be pretreated with a polymer in a conventional manner prior to application of the coating composition.

It is a fifth preferred condition of the present invention to apply the coating composition to form on the substrate a coating layer of solution of from 0.5 to 3.0 mm. thickness. A thickness of less than 0.5 mm. is insufficient to form a honeycomb-like structure composed of numerous oval voids having the largest dimension perpendicular to the plane of the coating layer.

It is a sixth preferred condition to soak the coating layer in a coagulating bath immediately after application of the coating composition onto the fibrous substrate. Exposure of the coating layer of the synthetic polymer solution to damp air or an atmosphere containing vapor of a non-solvent for the polymer must be avoided, because, when exposed to such an atmosphere, the coating layer absorbs the moisture or non-solvent and this brings about the same result as in the case wherein a non-solvent is previously incorporated in the coating composition.

It is a seventh preferred condition that the bath for coagulation of the coating layer should contain a non-solvent for the polymer in a concentration of at least 85% by weight. In this bath there occurs substantial coagulation of the layer of the coating composition to a synthetic polymer layer of a honeycomb-like structure. Such a high concentration of non-solvent in the coagulating bath causes quick formation of the surface skin on the layer of synthetic polymer solution. The skin hinders diffusive penetration of the solvent and retards extraction of the solvent from the inner un-coagulated layer of synthetic polymer solution and, consequently, retards coagulation, so that a honeycomb-like, cellular structure is formed. As the non-solvent, water is of the greatest utility from an industrial aspect. Methanol, ethanol, ethyleneglycol, glycerol and the like are also suitable. The coagulating bath may contain up to 15% of a solvent for the synthetic polymer, though less than 5% is preferred. The preferred temperature range of the coagulating bath varies depending upon the kind and concentration of the non-solvent to be employed. In cases where water is used as the non-solvent, the coagulation preferably is conducted at a bath temperature between 10° C. and 40° C.

It is an eighth preferred condition of the present invention to remove completely residual solvent and non-solvent from the so-coagulated coating layer. This is achieved by extraction and drying.

The last characteristic feature of the present invention consists in removing the surface of the so-formed porous coating layer having a honeycomb-like structure and a suede-like external appearance. The honeycomb-structured coating layer formed by the method of the present invention has a relatively hard, smooth surface skin, though it is removable by grinding with, e.g., sandpaper or buffing machine or by cutting with a sharp edge to disclose the honeycomb-like voids which impart to the coating layer a suede-like external appearance to touch or hand.

As shown in FIGURES 2 and 3, the ground or shaved surface has a honeycomb-like structure of which each recess has a diameter of 30 to 150 microns. The artificial suede prepared in accordance with the present invention exhibits an excellent wear resistance and flexural resistance owing to the strength of polyester-urethane elastomer and even has moisture resistance and water-repelling properties differing from natural suede.

Example 1

200 g. of a polyethylene adipate, of an average molecular weight of 2,000, a hydroxyl value of 56.3 and an acid value 1.6, was mixed with 9.0 g. of 1,4-butyleneglycol which had been purified by dehydrating under reduced pressure. The mixture was melted by heating to about 50° C., then there was added thereto, with vigorous stirring, 52.5 g. of diphenylmethane-4,4'-diisocyanate melted at about 50° C. The temperature of the mixture rose to 100 to 120° C. after about 4 to 5 minutes, and the mixture became viscous. The mixture was then cast on an iron plate coated with a mold release agent and the solidified mass was cured at 100° C. for 17 hours. The intrinsic viscosity as measured at 25° C. in N,N-dimethylformamide solution of the polyester-urethane elastomer was 1.18. The elastomer was dissolved in N,N-dimethylformamide (hereinafter referred to as "DMF") to form a solution of 17.0% solid content which exhibited a viscosity of 18,200 cps. at 25° C. and a coagulation value to water of 12.0%. To 295 g. of the elastomer solution of 17.0% solid content there was added 20 g. of magnesium carbonate and the solution was de-aerated under reduced pressure. After de-aeration the viscosity of the solution was 20,200 cps. at 25° C. The coating composition thus formed was applied to a substrate to form a coating film of the solution having a thickness of 1.6 mm. The fibrous substrate was a suede cloth made out of a mixed spun yarn containing 35% of vinylon (formalized polyvinyl alcohol fiber) and 65% of rayon which was obtained by impregnating with a 7.5% DMF solution of the same polyester-urethane elastomer as set forth above and coagulating the polymer in water. The uncoated side of the porous, so formed fibrous substrate was buffed and the substrate was then impregnated with water to a water content of 32% by weight prior to application of the coating composition. The substrate so coated with the coating composition was immediately soaked in an aqueous bath containing 3.6% by weight of DMF and kept at 30° C. for 6 minutes to coagulate the coating layer to a polymeric layer of a honeycomb-like structure. The coated fabric was then soaked in warm water at 50–60° C. for 40 minutes to extract therefrom DMF, squeezed and dried at 100° C. for 30 minutes. The surface of the coating layer, thus formed, was ground with a disc sander provided with a sand paper of 120 mesh grain size to obtain a leather-like sheet having a suede-like external appearance. The cross-section of the sheet exhibited presence of numerous oval voids having the largest dimension perpendicular to the plane of the sheet and a diameter of 40–70 microns.

Example 2

910 g. of epsilon-caprolactone and 90 g. of 1,4-butylene-glycol were reacted at 150° C. for 3 hours in the presence of 1.0 g. of tetrabutyl titanate to obtain a crude reaction product. The crude reaction product was purified by heating at 150° C. for 20 hours under a reduced pressure of 10 mm. Hg to obtain a polyester of an average molecular weight of 1,000, a hydroxyl value of 111.9 and an acid value of 0.03. 200 g. of the polyester and 32.0 g. of 1,4-butyleneglycol were mixed together and heated to about 50° C. Then there was added with vigorous stirring, 157.5 g. of diphenylmethane-4,4'-diisocyanate melted at about 55° C. Then the temperature of the mixture rose and the viscosity increased to a great extent. After 4 minutes the reaction mixture was cast onto an iron plate coated with a mold release agent and subjected to curing at 100° C. for 13 hours. The intrinsic viscosity of the polyester-urethane elastomer thus formed was 1.26 as measured at 25° C. in DMF. To 1,200 g. of DMF there was added 300 g. of the elastomer and then 6 g. of di-n-butylamine, and the mixture was heated at 80° C. for about 2 hours to form a homogeneous solution. The coagulation value of the solution to water was 8.3% and to methanol was 45.0%.

To 1,500 g. of the solution of a solids content of 20.0% there was added 120 g. of light calcium carbonate of a particle size of about 1.4 microns and then 180 g. of methanol. The so formed solution was de-aerated under reduced pressure. The coating composition thus formed had a solids content of 23.4% and a viscosity at 25° C. of 12,600 cps. The coating composition was applied to a fibrous substrate as employed in Example 1. To a continuous web of the fibrous substrate, 300 mm. in width, the coating composition was applied continuously at a rate of 1.5 m./min. by means of a doctor knife with a gauge space of 2.0 mm. and the so coated substrate was immediately introduced into a water bath kept at 28–29° C. and soaked therein for 3 minutes 40 seconds. The coated substrate was then soaked in warm water at 60–70° C. for 40 minute to extract therefrom DMF, squeezed and dried at 120° C. for 10 minutes. A coating composition containing methanol, as in this example, gave a smooth-surfaced coating film free from any ripple mark on its surface, even if coagulated by continuously being introduced into a coagulating bath. The polymeric coating layer thus formed had, as shown in the microscopic photograph ($\times 50$), FIG. 1, a honeycomb-like structure consisting of numerous oval voids having the largest dimension perpendicular to the plane of the layer.

The surface skin of the coating layer thus formed was removed by grinding with a buffing machine provided with an emery paper of 120 mesh grain size to obtain a sheet material having a suede-like external appearance. The sheet material was saturated with a 2% ethanol solution of Oil Black BW (Orient Kagaku Kogyo Co.) and dried in air to obtain a black-colored artificial suede. The suede-like artificial leather thus obtained exhibited excellent wear resistance. For instance, when subjected to a wearing test using a Custon-type abrasion tester in bending under a load of 454 g., there was observed little change until there was 500 repetitions of the abrasion. The artificial leather, as indicated by the microscopic photograph of FIGS. 2 and 3, had a honeycomb-like structure consisting of uniformly arranged open pores. FIGURES 2 and 3 are microscopic photographs ($\times 50$) of the cross-section and of the upper surface, respectively, of the suede-like artificial leather prepared in the manner as in this example.

Example 3

Coating compositions were prepared with a polyester urethane elastomer solution of 20.0% solids content as used in Example 2, and were applied to a fibrous substrate as used in Example 1. The coating compositions were prepared by adding into the polyester-urethane elastomer solution, both water and an inorganic solid in amounts as indicated in Table 1. The coating compositions were separately applied onto a fibrous substrate using a metallic frame of 1.6 mm. gauge thickness put on the substrate and, immediately thereafter, soaked in an aqueous bath containing 3.0–4.2% DMF and kept at 25–30° C. After about 10 minutes, the coated substrate was taken out of the coagulating bath and then soaked in water at 70–82° C. for 40 minutes to extract DMF, squeezed, and dried at 100° C. in a hot air dryer for 30 minutes. Formulations of the coating compositions and the properties of the products obtained were summarized in the following table. The table indicates that inorganic solids of too small particle sizes are inadequate for formation of honeycomb-like porous structures.

TABLE 1

| Sample No | 3–1 | 3–2 | 3–3 | 3–4 | 3–5 | 3–6 |
|---|---|---|---|---|---|---|
| Formulation of coating solutions (pts. by by wt.): | | | | | | |
| 20% polymer solution | 300 | 300 | 300 | 300 | 300 | 300 |
| Ca carbonate (particle size 0.7–1.0μ) | 25 | 35 | | | | |
| Mg carbonate (particle size 0.5–2.0μ) | | | 25 | | | 25 |
| Ca silicate (particle size 0.2–0.3μ) | | | | 25 | | |
| Fine silica (particle size 15–25 mμ) | | | | | 25 | |
| 5:1 DMF/water mixture | 5 | 5 | 5 | 5 | 5 | |
| Honeycomb structure of coating layers: | | | | | | |
| Uniformity of structure | (1) | (1) | (1) | (2) | (3) | (1) |
| Uniformity of porosity of walls of voids. | (1) | (1) | (1) | (2) | (3) | (2) |

[1] Good.  [2] Fair.  [3] Poor.

Example 4

870 g. (0.9 mole) of a poly (epsilon-caprolactone) glycol of a molecular weight 967, prepared in a manner similar to Example 2 and 162 g. (1.8 mole) of 1,4-butyleneglycol were dissolved in 1,870 g. of DMF of a moisture content 0.094%, then added thereto 3.7 g. of water to adjust the moisture content of the reaction system to 5.4 g. (0.3 mole). To the solution there was added 758 g. (3.03 moles) of diphenylmethane - 4,4' - diisocyanate, then exothermic reaction occurred and the temperature of the mixture rose to 62° C. The reaction mixture was then heated to 100° C. and, after 15 minutes, there were added to the mixture 3.8 g. of di-n-butylamine and 2,490 g. of DMF and the mixture was heated for an additional 45 minutes. After completion of the reaction, the reaction mixture was diluted with DMF to form a polyurethane solution of 25% solids content. The solution exhibited a viscosity at 25% C. of 96,000 cps. and a coagulation value to water of 6.2%. The intrinsic viscosity of the polyurethane elastomer in the solution was 1.08 as measured at 25° C. in DMF.

40 g. of a finely precipitated light calcium carbonate, 120 g. of methanol and 35 g. of DMF were added to and uniformly mixed with 400 g. of the 25% solution of polyurethane elastomer in DMF, and the so incorporated solution was de-aerated under reduced pressure to obtain a coating composition having a viscosity at 25° C. of 16,000 cps. The coating composition was applied onto a fibrous substrate as used as Example 1 to form thereon a coating layer of 1.8 mm. gauge thickness, exposed against an atmosphere of a relative humidity of 65% at 23° C. for periods of time as indicated in Table 2, and then soaked in an aqueous coagulating bath containing 3.0–4.2% of DMF for 10 minutes. The coated fibrous substrate was then soaked in warm water at 70–85° C. to extract residual DMF, squeezed and dried. The honeycomb structure of the coating layer thus formed was estimated by visual observations. The results are summarized in Table 2.

TABLE 2

| Structures: | Exposure time (mins.) |
|---|---|
| Uniform honeycomb structure all over the coating layer (soaked in water immediately after application) | 0 |
| Voids were observed in the top portion of the coating layer but not observed in the bottom portion | 5 |
| Irregularly distributed voids were observed all over the coating layer | 10 |
| Micro-porous all over the coating layer and free of visible voids | 15 |

Example 5

A coating composition, prepared in the manner of Example 4, was cast on a fibrous substrate, as used in Example 1, to form a coating layer of 1.8 mm. gauge thickness. Immediately thereafter, the so coated substrate was soaked in an aqueous bath containing DMF in concentrations as indicated in Table 3 for 10 minutes to effect coagulation. then soaked in warm water at 70–80° C. for 30 minutes to extract residual DMF, squeezed and dried. The products obtained were estimated by visual observation.

TABLE 3

| Structures: | Concentrations of DMF in coagulating baths (percent) |
|---|---|
| Uniform honeycomb-like cellular structure | 0 |
| Do | 3 |
| Fine uniform honeycomb-like cellular structure | 10 |
| Micro-porous structure having a few coarse voids | 20 |
| Micro-porous structure all over the coating layer | 30 |

The structure depends to a great extent on the temperature of the coagulating bath. Good results are obtained at temperatures of 25–40° C. in the case of this example.

We claim:

1. A method of producing synthetic leathers having the external appearance and touch of suede comprising the following steps:
   (1) providing a coating composition having a solid polymer content of from about 15 to about 30% by weight and a viscosity of 5,000 to 50,000 cps. by uniformly mixing
   (a) a solution of a synthetic polymeric material consisting essentially of a polyurethane elastomer derived from a polyester,
   (b) a finely divided inorganic solid of a particle size of from 40 millimicrons to 2 microns, said inorganic solid being substantially insoluble in the solution of the synthetic polymeric material, said finely divided inorganic solid particles serving as coagulation inducing nuclei for said synthetic polymeric material, and
   (c) in an amount not exceeding 15% of the coagulation value of the synthetic polymer solution, a liquid which is a non-solvent for the synthetic polymeric material, the amount of said non-solvent being such that any colloidal particles which are formed have a particle size no greater than 500 angstroms, said inorganic solids being substantially insoluble in said non-solvent;
   (2) applying said coating composition onto a fibrous substrate to form a coating layer of the composition of a thickness of from 0.5 to 3.0 mm.;
   (3) immediately after formation of the said coating layer, so as to avoid substantial exposure of the said layer to an atmosphere containing water vapor or vapor of a non-solvent for said polymeric material, soaking said coating layer in a coagulating bath containing a liquid non-solvent for said polymeric material in a concentration of at least 85% by weight,
   (4) then substantially completely eliminating residual solvent and non-solvent from the said coating layer to form a polymeric layer having a uniform honeycomb-like structure; and
   (5) removing the surface skin of the said polymeric layer.

2. The method of claim 1 wherein said fibrous substrate is napped or piled woven fabric or needle-punched non-woven fabric mat.

3. The method of claim 1 wherein said polymer is polyester glycol having molecular weight of 400–4000.

4. The method of claim 1 wherein said inorganic solid is one selected from the group consisting of precipitated light calcium carbonate, magnesium carbonate, fine clay, hydrated silicates and zinc oxide.

5. The method of claim 1 wherein said non-solvent liquid is water.

6. The method of claim 5 wherein said coagulating bath is at a temperature of 10°–40° C.

7. A suede-like synthetic leather produced by the method of claim 1.

8. The process of claim 1 wherein a microporous surface layer is formed during coagulation whereby extraction of solvent is hindered thereby yielding a honeycomb-like structure.

9. The process of claim 1 wherein said solution of synthetic polymeric material is maintained in the state of a clear solution upon the formation of nuclei in the presence of said inorganic particles.

10. The process of claim 1 wherein said solution of synthetic polymeric material is maintained substantially free of non-solvent.

References Cited

UNITED STATES PATENTS

| 2,871,226 | 1/1959 | McShane | 260—858 |
| 3,067,483 | 12/1962 | Hollowell | 117—140 X |
| 3,100,721 | 8/1963 | Holden | 117—135.5 |
| 3,322,568 | 5/1967 | Golodner | 117—135.5 |
| 3,360,394 | 12/1967 | Griffin et al. | 117—63 |
| 3,369,925 | 2/1968 | Matsushita et al. | 117—63 |

WILLIAM D. MARTIN, Primary Examiner

THEODORE G. DAVIS, Assistant Examiner

U.S. Cl. X.R.

117—63, 135.5, 161